United States Patent [19]
DiFilippo et al.

[11] Patent Number: 5,793,045
[45] Date of Patent: Aug. 11, 1998

[54] NUCLEAR IMAGING USING VARIABLE WEIGHTING

[75] Inventors: Frank P. DiFilippo, Mayfield Heights; Mark H. Heller, Garfield Heights, both of Ohio

[73] Assignee: Picker International, Inc., Cleveland, Ohio

[21] Appl. No.: 804,377

[22] Filed: Feb. 21, 1997

[51] Int. Cl.[6] .................................................. G01T 1/164
[52] U.S. Cl. ............................ 250/360.03; 250/363.07; 250/369
[58] Field of Search .................. 250/363.03, 363.07, 250/369, 363.04

[56] References Cited

U.S. PATENT DOCUMENTS

| | | | |
|---|---|---|---|
| 3,955,088 | 5/1976 | Muehllehner et al. | 250/363.03 |
| 4,424,446 | 1/1984 | Inbar et al. | 250/363.07 |
| 4,864,140 | 9/1989 | Rogers et al. | 250/363.03 |
| 5,331,553 | 7/1994 | Muehllehner et al. | |
| 5,345,082 | 9/1994 | Engdahl et al. | 250/363.07 |
| 5,491,342 | 2/1996 | Lim et al. | 250/363.07 |
| 5,532,489 | 7/1996 | Yamashita | |
| 5,591,977 | 1/1997 | Green et al. | |
| 5,608,221 | 3/1997 | Bertelsen et al. | 250/363.03 |

*Primary Examiner*—Edward J. Glick
*Assistant Examiner*—Darren M. Jiron
*Attorney, Agent, or Firm*—Timothy B. Gurin; John J. Fry

[57] ABSTRACT

A camera for use in coincidence imaging includes detectors (10a, 10b) disposed about an examination region (12). Coincidence logic (14) determines whether gamma rays detected by each of the detectors (10a, 10b) occur within a specified time interval. If so, the energy and positions of the detected events are determined. Energy discrimination circuitry (20a, 20b) associated with each detector (10a, 10b) determines if the detected events fall within a specified energy window. A list mode processor (22) generates a list of coincidence events. A rebinning processor (24) rebins the events, and a weight processor (26) weights each coincidence event based on the energy of the detected gamma rays.

20 Claims, 4 Drawing Sheets

NUCLEAR IMAGING USING VARIABLE WEIGHTING

BACKGROUND

The present invention relates to the field of nuclear medicine, and specifically to the field of coincidence imaging. It will be appreciated, however, that the invention is applicable in other applications where it is necessary to assign weights to detected events.

In nuclear imaging, a radiopharmaceutical such as $^{99m}$Tc or $^{201}$Tl is introduced into the body of a patient. As the radiopharmaceutical decays, gamma rays are generated. These gamma rays are detected and used to construct a clinically useful image.

Positron emission tomography (PET) is a branch of nuclear medicine in which a positron-emitting radiopharmaceutical such as $^{18}$F-fluorodeoxyglucose (FDG) is introduced into the body of a patient. Each emitted positron reacts with an electron in what is known as an annihilation event, thereby generating a pair of 511 keV gamma rays. The gamma rays are emitted in directions approximately 180° apart, i.e. in opposite directions.

A pair of detectors registers the position and energy of the respective gamma rays, thereby providing information as to the position of the annihilation event and hence the positron source. Because the gamma rays travel in opposite directions, the positron annihilation is said to have occurred along a line of coincidence connecting the detected gamma rays. A number of such events are collected and used to reconstruct a clinically useful image.

The energy spectrum for clinical positron annihilation imaging is characterized by a photopeak at 511 keV. Similarly, compton scattered radiation contributes to counts having energies ranging as high as the compton edge. In coincidence imaging, a dual energy window detection scheme is sometimes used. A window around the photopeak and a window in the vicinity of the compton region are identified. A coincidence event is counted if both detectors detect temporally simultaneous events within the photopeak window, or if one detector observes an event in the photopeak window while the other simultaneously detects an event in the compton window. In each case, a memory location is incremented to note the event and its location such that the respective events are weighted equally. Events in which both detectors observe compton events are discarded.

A multi-slice rebinning technique for coincidence imaging is also known from U.S. Pat. No. 5,331,553. According to this technique, more than one memory location is incremented based on the axial angle of the event. The '553 Patent teaches, however, the various events must be normalized and hence weighted equally regardless of the detected energies.

More generally in nuclear imaging, image projections or sinograms are generated by incrementing a memory location corresponding to position coordinates determined for each detected event. The memory location is incremented when the event energy is within a specified energy window. Alternatively, if the data is collected in list mode, a similar incrementation is done postprocessing.

A common thread to these techniques is that events are weighted in a binary fashion—they are either accepted or rejected. As a result, these techniques fail to convey the relative significance or certainty represented by each event. For example, the uncertainty in the location of an event falling within the compton window is greater than that of an event falling within the photopeak window. By failing to account for this uncertainty, important information regarding the detected events is lost and therefore cannot be used in formation of a resultant image. As will be appreciated, a method and apparatus which addressed this shortcoming is needed.

SUMMARY

According to a first aspect of the present invention, gamma rays characteristic of a positron annihilation event are detected, and their energies determined. Based on the determined energies, the positron annihilation event is assigned one of at least three different weights. These steps are repeated for a plurality of positron annihilation events, and an image indicative of the weighted events is generated.

According to a more limited aspect of the present invention, a first energy window is established. The first energy window includes an energy which is characteristic of a gamma ray generated by a positron annihilation. A second energy window lower in energy than the first window is established, and the energy of the detected gamma rays in relation to the first and second windows is determined. If the determined energy of both of the gamma rays is within the first window, the event is assigned a first weight. If the determined energy of one of the gamma rays is within the first window and the determined energy of the other gamma ray is within the second window, the event is assigned a second weight. If the determined energy of both of the gamma rays is within the second window, the event is assigned a third weight.

According to still other more limited aspects of the invention, the first weight may be greater than the second weight, and the third weight may be zero. The second energy weight may include a compton edge.

According to another limited aspect of the present invention, the positions of the detected gamma rays are determined, and a memory address is generated based on the positions. The weight value is added to the value contained in the memory address.

According to another aspect of the present invention, gamma radiation produced by a radionuclide decay is detected. The occurrence of a detected event is signalled, and the position of the event is determined. A parameter indicative of the accuracy of the determined position is measured, and the event is assigned one of at least three weight values based on the value of the measured parameter. These steps are repeated for a plurality of radionuclide decays, and an image is generated.

According to a limited aspect of the invention, the measured parameter is the energy of the detected gamma radiation. According to another limited aspect of the invention, the detected radiation comprises first and second gamma rays produced by a positron annihilation event. In still another aspect of the present invention, the measured parameter is the spatial distribution of the scintillator light pulse.

According to another aspect of the present invention, gamma radiation produced by a radionuclide decay is detected. The occurrence of a detected event is signalled, and the energy of the detected radiation is determined. The event is assigned one of at least three different weights based on the determined energy.

A first advantage of the present invention is that information related to the likely contribution of an event to the quality of a resultant image is preserved. Another advantage is that detected events are weighted according to likely contribution to image quality. Still other advantages will be recognized by those skilled in the art upon reading and understanding the following description.

FIGURES

DESCRIPTION

Figure 1:
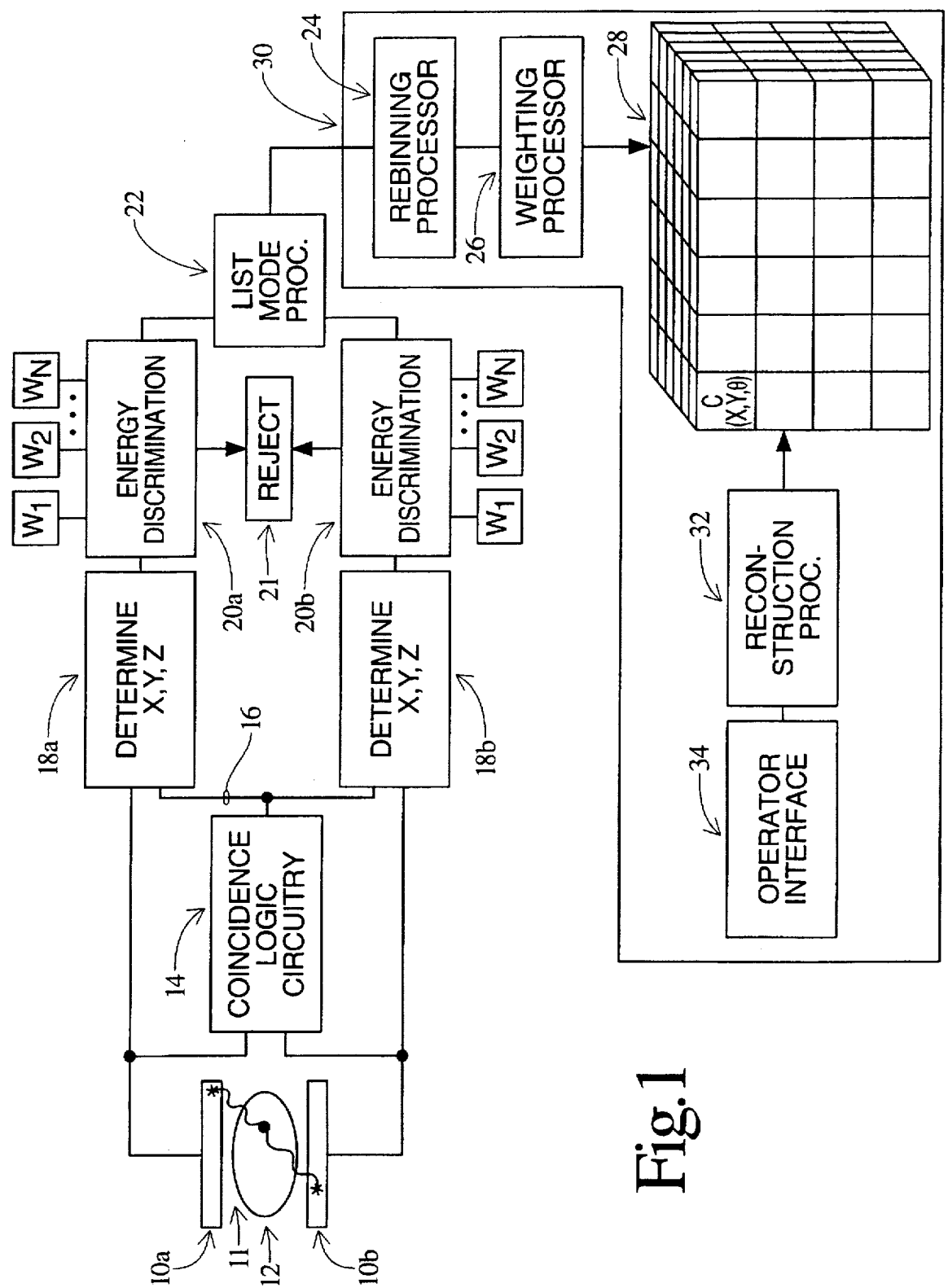
FIG. 1 is a block diagram of a gamma camera according to the present invention.

In nuclear imaging, a detected event is characterized by an x,y position and energy z. In coincidence imaging, a coincidence event is characterized by two events which are detected temporally simultaneously. A number of such coincidence events are detected and an image is reconstructed, typically by filtering the resultant projections and back-projecting lines through image space. The accuracy of the image is thereby related to the accuracy of the projections, which are in turn composed by summing the contributions of the individual detected events.

The detected events, however, often have different uncertainties. For example, the light output of the scintillation crystal is related to the energy of the detected radiation. Because lower energy events produce less scintillation light from which the position is calculated, the measured position can be determined with less confidence. Higher energy events, on the other hand, produce more scintillation light such that the position can be determined with relatively greater confidence.

Confidence in the accuracy of a detected event is also impacted by scattering. As is well known in the art, scattering causes a change in energy of the gamma ray, together with a change in its direction.

Detected events can be grouped into various categories, depending on the existence and location of scattering. For example, a true event occurs when a gamma ray is detected without having been scattered. Because the gamma ray can be assumed to have traveled in a straight line before being detected, the actual location of the underlying event is known with relatively high accuracy. Not having been scattered, these gamma rays are characterized by energies in the region of the primary photopeak of the particular radiopharmaceutical in use (e.g., approximately 140 keV for $^{99m}$Tc, 80 keV for $^{201}$Tl, 511 keV for gamma rays generated by positron annihilation). Detected events in the upper portion of the primary photopeak are particularly unlikely to have been scattered. The positions of these events can therefore be determined with an especially high degree of confidence. As a result, true events contribute positively to image quality.

In a scintillator scattered event, compton scattering occurs within the scintillator crystal, for example if a gamma ray is only partially absorbed by the crystal in a first interaction. These events are detected as having energies below that of the compton edge for the particular radiopharmaceutical (e.g., approximately 50 keV for $^{99m}$Tc, 19 keV for $^{201}$Tl, 340 keV for gamma rays generated by positron annihilation). Because the location at which the event is detected is the location where the scintillator absorption (and hence the scattering) occurred, the position of the underlying event can be determined with a relatively high degree of accuracy. As a result, scintillator scatter events tend to contribute positively to image quality. Scintillator scattering is a dominant form of interaction in positron annihilation imaging when using a NaI(Tl) scintillation crystal but is less common when a BGO scintillator is used. Scintillator scattering is particularly significant at the higher energies associated with annihilation imaging.

In yet another type of scintillator scattered event, an incident gamma ray undergoes one or more compton interactions before its energy is absorbed by the scintillation crystal. Because the entire energy of the gamma ray is absorbed by the crystal essentially instantaneously, this type of interaction is detected as having an energy in the region of the primary photopeak. Inasmuch as the event of this type is characterized by more than one interaction (each having a different location), the position of the underlying event can be determined with somewhat less accuracy than in the case of a single scintillator scatter interaction. Scattered events of this type nonetheless tend to contribute positively to image quality.

In a body scattered event, scattering occurs within the body under examination, thereby changing the direction of the emitted gamma ray. Because the location of the scattering event is unknown and because of the change in direction, the location of the underlying event can be determined with only a relatively low degree of accuracy. These gamma rays are detected as having energies in the compton region of the particular radiopharmaceutical. Scattered events of this type thus tend to degrade image quality.

Other types of scattering events can also occur. For example, a backscatter event occurs when a gamma rays passes through the scintillator without interacting, backscatters off the glass backing in the detector or the detector electronics, and is absorbed on the second pass through the crystal. In positron annihilation imaging, many detected backscattered gamma rays are characterized by energies in the 170–200 keV range. Scattered events of this type also tend to degrade image quality.

Coincidence events can be similarly characterized. In a true coincidence event, each detected gamma ray is detected as a true event. Each gamma ray arises from the same positron annihilation, and the gamma rays are detected without having been scattered. Thus, the assumption that the decay occurred along a line of coincidence (the colinearity assumption) is valid, and the event will contribute positively to image quality.

In a partially scattered coincidence event, one of the gamma rays is detected as a true event and the other is detected as either a scintillator scattered event or a body scattered event. In the former case, the colinearity assumption is likely to be valid and the event will contribute positively to image formation. In the latter case, however, the colinearity assumption is not valid, and the event will tend to have a deleterious effect on image quality.

In a dual scattered coincidence event, both of the gamma rays are detected as scattered events. Inasmuch as neither of the events is detected is a true event, the likelihood that at least one of the detected events arises from a body scattered event is relatively greater than the case in which one is a true event. As a result, the colinearity assumption is less likely to be true, and the event is less likely to contribute positively to image quality.

As will be appreciated from the foregoing discussion, nuclear imaging involves the detection and measurement of numerous discrete events, each event including an element of uncertainty. Statistical measurement theory states that separate measurements $x_i$ with standard deviations $\sigma_i$ can be combined according to the following equations to achieve the best estimates of the mean $\bar{x}$ and standard deviation $\sigma$:

$$\bar{x} = \frac{\sum_i \frac{x_i}{\sigma_i^2}}{\sum_i \frac{1}{\sigma_i^2}} \quad (1)$$

$$\sigma^2 = \frac{1}{\sum_i \frac{1}{\sigma_i^2}} \quad (2)$$

Thus, when determining the means, events with smaller uncertainty are weighted more than events with larger uncertainty. This principle can be utilized to maximize the quality of nuclear images.

With reference to FIG. 1, a gamma camera for use in coincidence imaging includes detectors 10a, 10b located in opposed positions about an examination region 11. The examination region 11 is sized to accept an object being imaged, such as a patient 12. A patient couch (not shown) or other subject support 12 supports the subject within the examination region 11.

Each detector 10b includes a NaI(Tl) scintillator crystal, an x,y array of photomultiplier tubes (PMTs), and processing electronics. Energy from gamma rays striking the scintillator crystal is converted to light which is detected by one or more of the PMTs, thereby signalling a detected event.

Coincidence logic circuitry 14 determines whether events detected by both detectors 10a, 10b occurred simultaneously. More specifically, the coincidence logic determines whether both detectors detect a gamma ray within a predetermined coincidence time interval, for example on the order of 15 nanoseconds. If so, the coincidence logic 14 generates a digital coincidence signal 16 which indicates that a coincidence event has occurred. If, on the other hand, the detectors 10a, 10b detect events which are separated in time by more than the coincidence time interval, the coincidence signal 16 is not generated, and the events are not processed further.

Associated with each detector 10a, 10b is energy and position determining circuitry 18a, 18b which determines both the energy z and position x,y of the detected events. The circuitry 18a, 18b is triggered by the coincidence signal 16 such that the energy z and position x,y is determined only for coincident events. For each coincidence event, positions and energies $x_1$, $y_1$, $z_1$, and $x_2$, $y_2$, $z_2$ are generated corresponding to the events detected by the detectors 10a, 10b. Non-coincident events are not processed.

Energy discrimination circuitry 20a, 20b determines whether the detected events fall within one of one or more predetermined energy windows $W_1$, $W_2$, ... $W_n$. Coincidence events in which one or both of the detected events falls outside one of the energy ranges $W_n$ are rejected, and the event is not processed further.

A list mode processor 22 generates a list which includes the energy z and position x,y of the detected events in each of a plurality of coincidence event pairs. The output of the list mode processor 22 is preferably stored in a memory for further processing at a convenient time, for example after data acquisition for a particular patient has been completed.

Figure 2A:
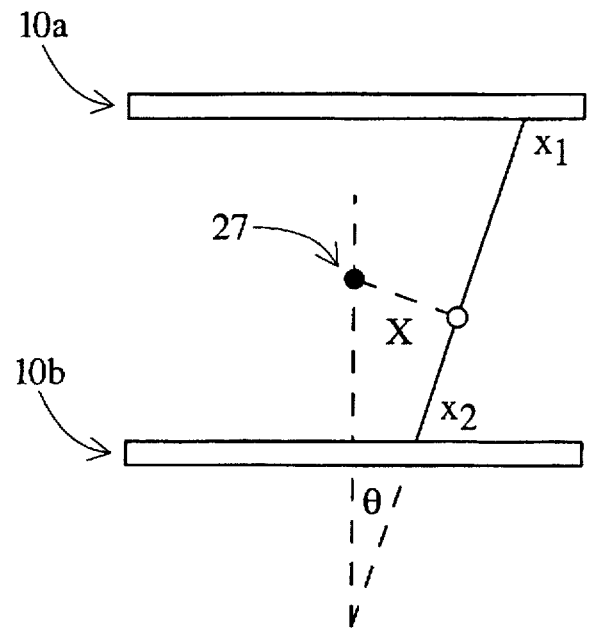
FIG. 2A is a view of the detectors looking in the axial direction illustrating transverse rebinning.
Figure 2B:
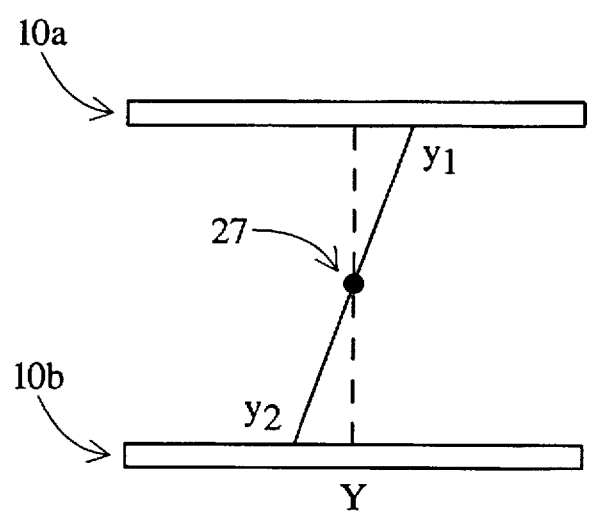
FIG. 2B is a view of the detectors looking in the transverse direction illustrating axial rebinning.

Further processing is preferably accomplished using a conventional imaging computer 30. A rebinning processor 24 sorts the list mode data based on the locations $x_1$, $y_1$ and $x_2$, $y_2$ of the detected events. With reference to FIG. 2A, a point such as the center 27 of the imaging region 12 is defined. The transverse coordinates $x_1$, $x_2$ are used to calculate a transverse coordinate X in relation to the center 27 and transverse angle in relation to the face of one of the detectors 10a, 10b. With reference to FIG. 2B, the list mode data is also rebinned in the axial direction using the well-known "single-slice rebinning" algorithm. The axial position coordinates $y_1$, $y_2$ are used to calculate a mean axial coordinate Y, and the axial angle $\phi$ is assumed to be zero. Hence, rebinned coordinates (X, Y, $\theta$) for each coincidence event are determined based on the detected coordinates ($x_1$, $x_2$, $y_1$, ($y_2$). Also associated with each rebinned coincidence event is a tag indicative of the energy of each of the detected events. This tag may be, for example, the respective energy window $W_n$ associated with each of the detected events.

It will be appreciated that other rebinning techniques can be used. For example, the axial rebinning could also be conducted in a manner analogous to that used in the transverse direction such that the detected axial coordinates $y_1$, $y_2$ are used to calculate an axial coordinate Y and axial angle $\phi$. Hence, rebinned coordinates (X, Y, $\phi$, $\theta$) would be generated for each coincidence event.

An event weight processor 26 assigns each coincidence event a weight based on the confidence in its accuracy. More specifically to the preferred embodiment, the weight processor 26 assigns a weight $\delta$ to the coincidence event based on the energy of the individual detected events. In this way, events are weighted in relation to the confidence in their positional accuracy and hence their probable contribution to image quality. Events which are likely to contribute positively to image quality are weighted more heavily than those that are not.

The rebinned coordinates (X, Y, $\theta$), together with the weight $\delta$ are used to update a projection matrix memory 28. The memory 28 can be visualized as a three dimensional array, with each element having a unique address based on the transverse position X, the axial position Y, and transverse angle $\theta$. Each element or memory location contains a count C(X,Y,$\theta$). For each coincidence event, the appropriate location in memory 28 is updated to reflect the occurrence and the weight of the event according to the relation:

$$C_{updated}(X,Y,\theta) = C_{previous}(X,Y,\theta) + \delta \quad (3)$$

A reconstruction processor 32 processes the data in memory 28 using techniques such as filtered backprojection or iterative reconstruction to generate images corresponding to the object being imaged. Of course, the invention is equally applicable to iterative and other reconstruction techniques. An operator interface 34 preferably includes a video processor and monitor for converting selected portions of the images into human readable form.

Those skilled in the art will recognize that the invention is not restricted to the embodiment described above. For example, three or more detectors 10 disposed about the imaging region 12 can be used, with each coincidence event being characterized by gamma rays simultaneously detected by two of the three or more detectors. Similarly, the detectors 10 can readily be rotated about the patient 12 and/or moved axially with respect to the patient as data is collected. Alternative scintillators such as bismuth germanate (BGO) can also be used.

Various of the functions described above may also be performed in a different order. For example, the energy weighting of a coincidence event may be determined at various points in the process, for example prior to rebinning.

Similarly, the energy discrimination can occur after the event weight is established, by setting the weight of rejected events to zero. It will also be appreciated that the list mode output can be generated at various stages. Alternately, data may be rebinned, weighted, and stored in real time.

Similarly, the invention is applicable to traditional SPECT imaging such that the coincidence logic circuitry 14 is not required. As in coincidence imaging, two or more energy windows are defined in relation to energy spectrum of the particular radiopharmaceutical being used, for example in the regions of the photopeak and the compton edge. Energy windows may also be established in the photopeak regions of a radiopharmaceutical such as I-131 which has two primary photopeak. In this case, events falling within the higher of the energy windows are weighted more heavily than those falling within the lower energy window. Again, each detected event is weighted according to its energy, and an image is constructed.

In operation, a radiopharmaceutical such as FDG is introduced into the body of a patient 12, and the patient is placed in the imaging region 11. An event is detected by one of the detectors, for example detector 10a. A second event is detected by the other detector 10b. If the two events occurred temporally within the coincidence time interval, as is characteristic of a positron annihilation, the coincidence logic 14 generates a coincidence signal 16. Triggered by the coincidence signal, the energy level and position circuitry 18a, 18b determines the energy level z and x,y position of each detected event.

Figure 3:
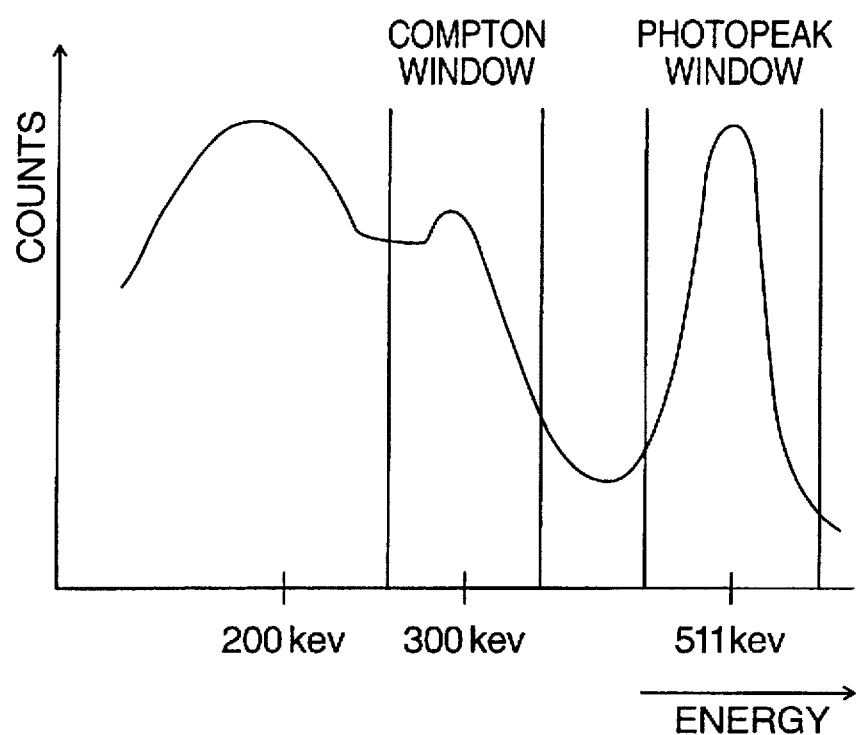
FIG. 3 illustrates an energy spectrum characteristic of gamma rays produced by positron annihilation.

The energy discrimination circuitry 20a, 20b determines whether each detected event falls within a preselected energy window. With reference to FIG. 3, an energy window is established in the vicinity of the 511 keV primary photopeak characteristic of a positron annihilation. The lower end of this photopeak window is preferably placed at approximately 430 keV, while the upper end is preferably placed at about 590 keV. Similarly, an energy window is placed in the compton region at about 300 keV. The lower end of this compton window is preferably placed at approximately 260 keV, while the upper end is preferably placed at about 340 keV.

If one or both of the detected events falls outside both the photopeak and the compton windows, the discrimination circuitry 20a, 20b causes both events to be rejected. Similarly, if both events fall within the compton window, both events are rejected. If both of the events fall within the photopeak window, or if one of the events falls within the photopeak window and the other falls within the compton window, the respective x,y positions and energy z values are processed by the list mode processor 22 and stored until data collection is completed.

Each of the listed coincidence events is then rebinned by the rebinning processor 24. The coincidence event is then assigned a weight by the weight processor 26. Coincidence events in which both detected events fall within the photopeak energy range are weighted most heavily; coincidence events in which one of the detected events falls within the photopeak range and the other event falls within the compton energy range are weighted less heavily. As noted above, coincidence events in which both detected events fall within the compton range are rejected by the rejection circuitry 21 and thus have an effective weight of zero. Table I shows the resulting weight applied to each type of coincidence event based on the energy of the individual detected events:

TABLE I

|  | Photopeak-Photopeak | Photopeak-Compton | Compton-Compton |
|---|---|---|---|
| Weight | 2 | 1 | 0 |

Figure 4:
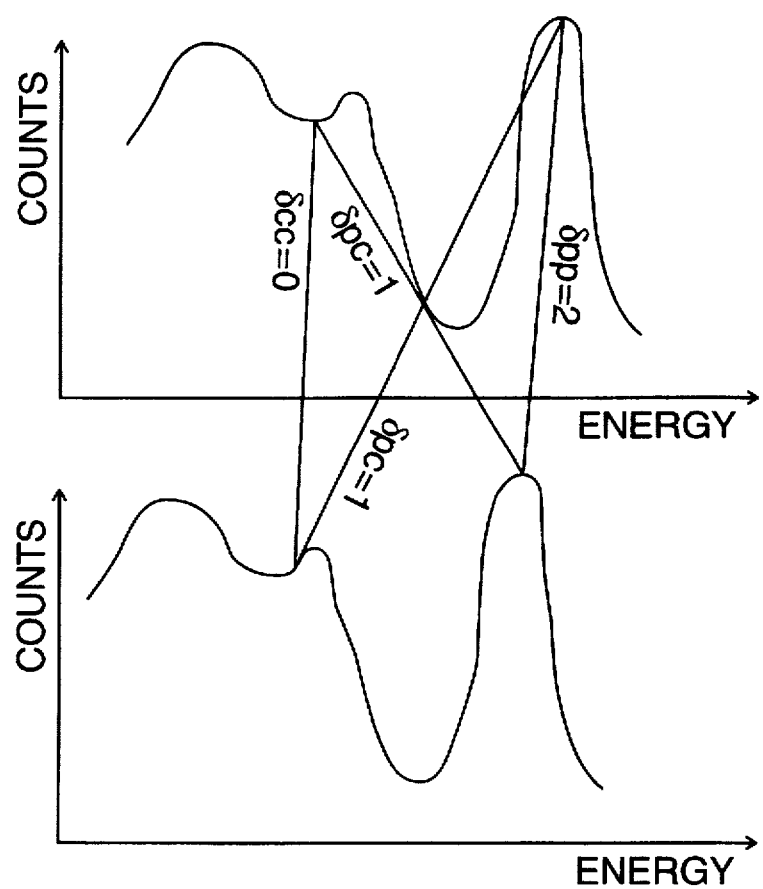
FIG. 4 illustrates the weighting applied to detected coincidence events based on the energy level of the detected gamma rays.

This information is shown graphically in FIG. 4.

Other weights, both integer and non-integer, are possible and can readily be implemented. It is also not necessary that the rejection circuitry 21 reject the compton-compton events. Compton—compton coincidence events could then be given a weight of zero (or a desired non-zero weight) by the weight processor 26.

The appropriate location in the memory 28 is then updated. For a coincidence event having coordinates (X,Y,θ) with each detected event falling within the photopeak window, for example, the corresponding location in the memory 28 is updated as follows:

$$C_{updated}(X,Y,\theta) = C_{previous}(X,Y,\theta) + 2 \tag{4}$$

For a coincidence event having coordinates (X,Y,θ) with one detected event falling within the photopeak window and the other falling within the compton window, for example, the corresponding location in the memory 28 is updated as follows:

$$C_{updated}(X,Y,\theta) = C_{previous}(X,Y,\theta) + 1 \tag{5}$$

Those skilled in the art will recognize that the invention is not limited two energy windows. Thus, for example, three or more energy windows may be used, with coincidence events again weighted according to the energy associated with each of the detected gamma rays. Similarly, more than three weight values can be established based on the energy of the detected events.

The present invention can also be used to weight detected events based on parameters other than energy. As described above, some scintillator scatter events are characterized by multiple interactions within the scintillator. Light produced by the scintillator in response to these types of events tends to be distributed over a greater area than in single interaction events, thereby leading to a greater positional uncertainty. For example, a single compton interaction followed by a complete absorption will tend to produce light in a generally elliptical pattern, the foci of the ellipse being the sites of the interactions. The event would ordinarily be assigned a position between the two foci.

Accordingly, the energy and position determining circuitry 18a, 18b may also be used to determine the spatial distribution of the scintillation light pulse, for example by performing a conventional second moment calculation. The event is then assigned a weight which is generally inverse to the spatial distribution. Thus, an event producing light having a relatively smaller spatial distribution is weighted more heavily than an event having a larger spatial distribution. In this way, events in which the position can be determined with greater accuracy are weighted more heavily then events where the position can be determined with less accuracy.

The invention has been described in relation to its preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of generating an image comprising the steps of:
   detecting gamma rays characteristic of a positron annihilation event;
   determining the energies of the detected gamma rays;
   assigning the positron annihilation event one of at least three different weights based on the determined energies;
   repeating the steps of detecting, determining, and assigning for a plurality of positron annihilation events; and
   generating an image indicative of the weighted events.

2. The method of claim 1 further comprising the steps of:
   establishing a first energy window which includes an energy which is characteristic of a gamma ray generated by a positron annihilation;
   establishing a second energy window which is lower in energy than the first energy window;
   determining the energy of the detected gamma rays in relation to the first and second windows; and
   assigning the event a first weight if the determined energy of both of the gamma rays is within the first window, a second weight if the determined energy of one of the gamma rays is within the first window and the determined energy of the other gamma ray is within the second window, and a third weight if the determined energy of both of the gamma rays is within the second window.

3. The method of claim 2 wherein the first weight is greater than the second weight.

4. The method of claim 2 wherein the third weight is zero.

5. The method of claim 2 wherein the second energy window includes a compton edge.

6. The method of claim 1 further comprising the steps of:
   determining the position of the detected gamma rays;
   generating a memory address based on the determined positions, the memory address containing a value; and
   adding the assigned weight to the value contained at the memory address.

7. The method of claim 1 further comprising the step of generating a list of detected annihilation events.

8. A method of generating an image comprising the steps of:
   detecting gamma radiation produced by a radionuclide decay;
   signaling the occurrence of a detected event;
   determining the position of the detected events;
   measuring a parameter indicative of the accuracy of the determined position;
   assigning the detected event one of at least three weight values based on the measured parameter for varying the degree that the detected event contributes to an image;
   repeating the steps of detecting, signaling, determining, measuring, and assigning for a plurality of radionuclide decays; and
   generating an image indicative of the weighted events.

9. The method of claim 8 wherein the measured parameter is the energy of the detected gamma radiation.

10. The method of claim 8 wherein the detected gamma radiation comprises first and second gamma rays produced by a positron annihilation event.

11. The method of claim 8 wherein the gamma radiation is detected using a scintillator means for producing light in response to gamma radiation and the measured parameter is the spatial distribution of the light.

12. A method of generating an image comprising the steps of:
    detecting gamma radiation produced by a radionuclide decay;
    signalling the occurrence of a detected event;
    determining the energy of the detected radiation;
    assigning the detected event one of at least three different weight values based on the determined energy for varying the degree that the detected event contributes to an image;
    repeating the steps of detecting, signalling, determining, and assigning for a plurality of radionuclide decays; and
    generating an image indicative of the weighted events.

13. The method of claim 12 further comprising the steps of:
    determining the position of the detected radiation;
    generating a memory address based on the determined position, the memory address containing a value;
    adding the weight value to the value contained in the address.

14. A gamma camera comprising:
    means for detecting gamma rays characteristic of positron annihilation events;
    means for determining the energies of the detected gamma rays for each positron annihilation event;
    means for assigning each positron annihilation event one of at least three different weights based on the determined energies;
    means for generating an image indicative of the positron annihilation events and their weights.

15. The gamma camera of claim 14 wherein the means for detecting comprises at least two scintillation detectors disposed about an examination region.

16. The gamma camera of claim 15 wherein the scintillation detectors comprise sodium iodide.

17. The gamma camera of claim 15 wherein the means for detecting further comprises coincidence detection circuitry in electrical communication with the detector, the coincidence detection circuitry generating a signal upon detection of a coincidence event.

18. The gamma camera of claim 14 further comprising:
    means for establishing a first energy window;
    means for establishing a second energy window lower in energy than the first energy window;
    means for determining the energy of the detected gamma rays in relation to the first and second energy windows; and
    means for assigning the event a weight based on the energy of the detected gamma rays in relation to the first and second energy windows.

19. The gamma camera of claim 18 wherein the first energy window includes an energy which is characteristic of a positron annihilation and the second energy window includes an energy characteristic of a compton edge.

20. The gamma camera of claim 19 further comprising means for assigning the event a first weight if the energy of both of the detected gamma rays is within the first window, a second weight if the energy of one of the detected gamma rays is within the first window and the energy of the other detected gamma ray is within the second window, and third weight if the energy of both of the detected gamma rays is within the second window.

* * * * *